United States Patent
Corrado et al.

(10) Patent No.: US 7,222,135 B2
(45) Date of Patent: May 22, 2007

(54) METHOD, SYSTEM, AND PROGRAM FOR MANAGING DATA MIGRATION

(75) Inventors: Francis R. Corrado, Newton, MA (US); Daniel Nemiroff, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 10/747,922

(22) Filed: Dec. 29, 2003

(65) Prior Publication Data

US 2005/0198450 A1    Sep. 8, 2005

(51) Int. Cl.
 *G06F 17/30* (2006.01)
(52) U.S. Cl. ....................................................... 707/201
(58) Field of Classification Search ............... 707/1, 707/2, 9, 10; 711/114; 714/7; 709/224
See application file for complete search history.

(56) References Cited

U.S. PATENT DOCUMENTS

| | | | | |
|---|---|---|---|---|
| 5,701,463 | A | * | 12/1997 | Malcolm ........................ 707/10 |
| 6,058,489 | A | * | 5/2000 | Schultz et al. .................. 714/7 |
| 6,467,023 | B1 | * | 10/2002 | DeKoning et al. .......... 711/114 |
| 2004/0260873 | A1 | * | 12/2004 | Watanabe ................... 711/114 |

OTHER PUBLICATIONS

Intel Corporation, "Intel 80303 I/O Processor", *Datasheet*, Jun. 2002, pp. 1-56.
Patterson, D.A., G. Gibson, and R.H. Katz, "A Case for Redundant Arrays of Inexpensive Disks (RAID)", *ACM SIGMOD International Conference on Management of Data*, Jun. 1988, pp. 109-116.

* cited by examiner

*Primary Examiner*—Etienne P LeRoux
(74) *Attorney, Agent, or Firm*—Konrad Raynes & Victor LLP (57) ABSTRACT

Provided are a method, system, and program for managing data migration from one data organization type to another. In one embodiment, a migration manager defers writing progress indicators to reduce data write operations during the migration process. In one embodiment, progress indicators are written to configuration areas of disk drives when a condition is met. One example of a condition is the expiration of a time period since the last progress indicator was written. Another example of a condition is an overlap between the destination of a unit of data being migrated and the source of the unit of data. Yet another example is an overlap between the destination of a unit of data and a portion of the data source which has been copied but a progress indicator has not yet been written covering the data source portion.

40 Claims, 7 Drawing Sheets

METHOD, SYSTEM, AND PROGRAM FOR MANAGING DATA MIGRATION

BACKGROUND

1. Field

Embodiments relate to a method, system, and program for managing migration of data to another system of organization, such as a RAID system.

2. Description of Related Art

Various techniques have been proposed for organizing data stored in data storage devices such as disk drives. One such data storage organization is referred to as Redundant Array of Independent (or Inexpensive) Disks or (RAID). In a RAID organization, two or more disk drives are employed in combination to improve fault tolerance or performance, or both. There are different types of RAID data storage organizations and these different types are often referred to as RAID "levels 0, 1, 2 . . . . In a RAID level 0 data organization, for example, the data of a user file is "striped", that is, blocks of user data are spread across multiple disks to improve performance. However, there is generally no redundancy provided for recovery of data should one of the drives fail in a RAID level 0 organization of data. A RAID level 3 organization of data is similar to RAID level 0 but one disk is typically reserved to store error correction data, often referred to as "parity data." This parity data may be used to reconstruct lost user data should one of the drives fail. In a RAID level 5 data organization, parity data is provided for each stripe of data across the array of disk drives and no particular disk drive is dedicated to storing the parity data. Instead, blocks of parity data for the stripes of user data are distributed throughout all the disks of the array, to further improve performance.

Figure 1:
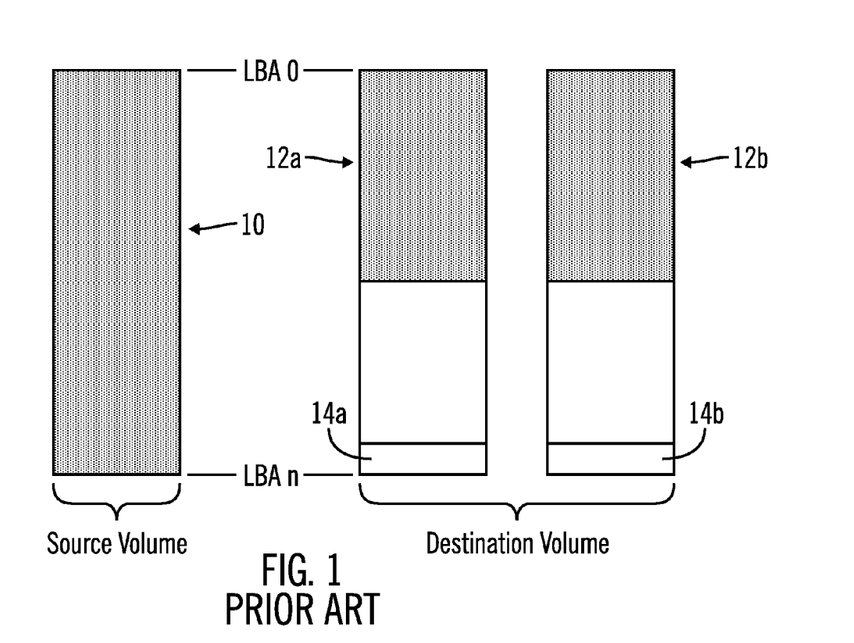
FIG. 1 illustrates a prior art data migration from a non-RAID disk drive to a RAID array of disk drives.

As RAID type data organizations becomes increasingly popular, there is an increasing need for efficient data migration processes for transferring data from a standard or non-RAID data storage organization to a RAID type organization. FIG. 1 shows a schematic diagram of user data stored on a disk drive 10 being migrated to a pair of RAID level 0 organized disk drives 12a, 12b. In the example of FIG. 1 user data is stored in the non-RAID disk 10 starting at LBA (Logical Block Addressing) location 0 to LBA n. Logical block addressing translates the cylinder, head and sector specifications of the drives 10, 12a, 12b into addresses that can be used by many operating systems.

In the migration process, a unit of user data from the non-RAID disk 10 is copied and spread across both of the destination RAID level 0 disks 12a, 12b in a stripe of data. Typically, the user is allowed access to the data except to the particular unit of data being migrated. In many migration processes, data is copied from the source disk or disks to the RAID array of disks in sequential order, starting at the lowest address, here LBA 0 in this example, and then data is copied at sequentially higher addresses. As the migration proceeds, migration progress indicators or "checkpoints" are typically written to a configuration area 14a, 14b of each RAID disk 12a, 12b. The configuration areas 14a, 14b contain what is often called RAID "metadata" which is configuration and management information typically maintained by the RAID subsystem which organizes the data. The metadata is usually hidden from access by the host by the RAID organization software of the RAID subsystem.

Each checkpoint written to the configuration areas 14a, 14b typically contains an address or other pointer which identifies the highest address of user data which has been successfully migrated. Should there be a disruption such as a loss of power during the migration process, the entire migration process does not need to restart from the beginning, that is, LBA 0, in this example. Instead, the migration process may be resumed at the same or next address indicated by the last checkpoint written to the configuration areas 14a, 14b. Once all of the user data has been successfully copied from the non-RAID source disk 10, half of the user data will be written to RAID disk 12a and half to RAID disk 12b of the array of RAID disks 12a, 12b as shown in the example of FIG. 1.

Notwithstanding, there is a continued need in the art to improve the performance of data migration.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description, reference is made to the accompanying drawings which form a part hereof and which illustrate several embodiments. It is understood that other embodiments may be utilized and structural and operational changes may be made.

Figure 2:
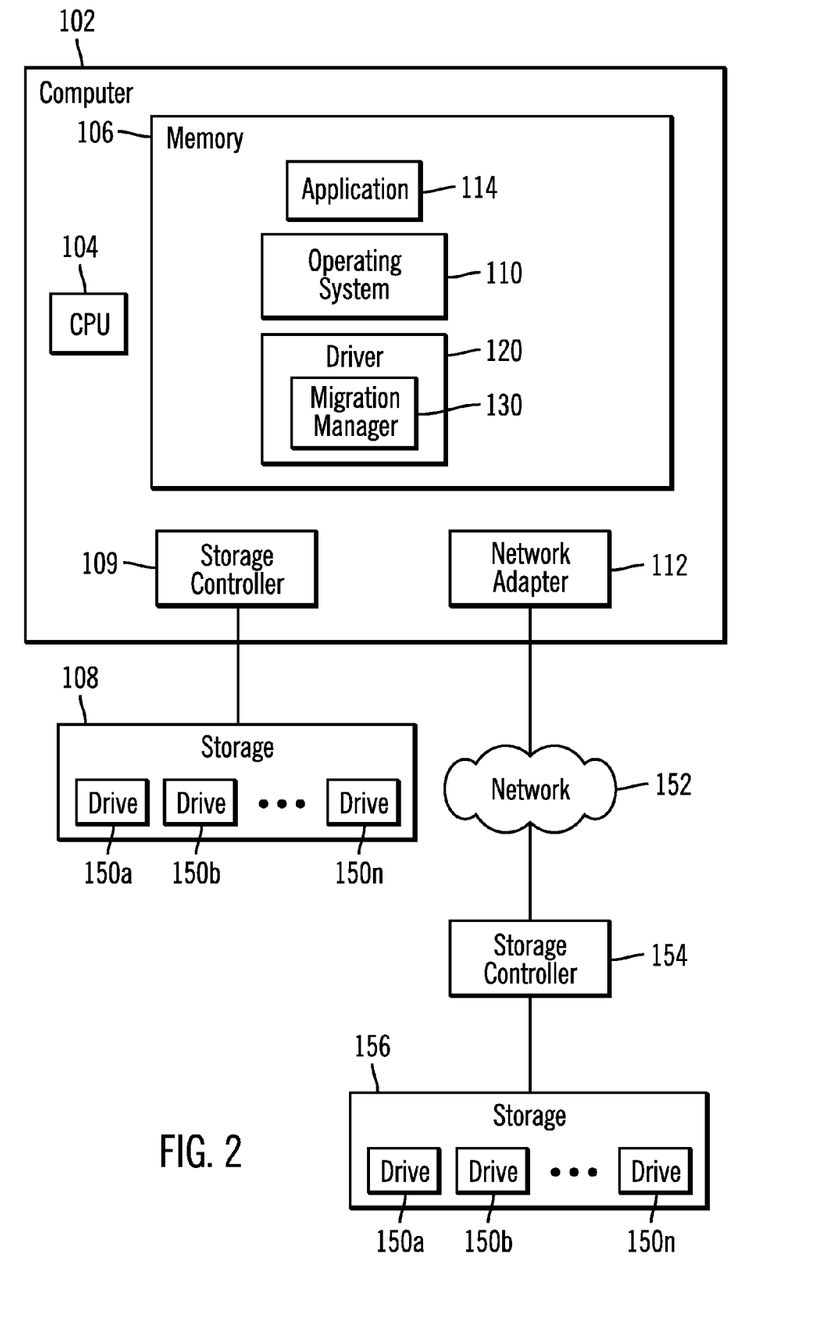
FIG. 2 illustrates one embodiment of a computing environment.

FIG. 2 illustrates a computing environment in which a data migration may be implemented. A computer 102 includes one or more central processing units (CPU) 104 (only one is shown), a memory 106, non-volatile storage 108, a storage controller 109, an operating system 110, and a network adapter 112. An application program 114 further executes in memory 106 and is capable of reading data from and writing data to the storage 108. The computer 102 may comprise any computing device known in the art, such as a mainframe, server, personal computer, workstation, laptop, handheld computer, telephony device, network appliance, virtualization device, storage controller, etc. Any CPU 104 and operating system 110 known in the art may be used. Programs and data in memory 106 may be swapped into storage 108 as part of memory management operations.

A device driver 120 executes in memory 106 and includes storage controller specific commands to communicate with the storage controller 109 and interface between the operating system 110 and the storage controller 109. The device driver 120 includes a migration manager 130 which manages the migration of data from one data organization type to another. For example, the storage 108 may include a plurality of disk drives 150a, 150b . . . 150n, in which the data is initially stored in one or more of the disk drives 150a, 150b . . . 150n in a standard organization type. The migration manager 130 can be used to manage the migration of the data to another organization type such as one of the RAID levels. The migration may include one or more of the disk drives 150a, 150b . . . 150n containing nonRAID or to different disk drives 150a, 150b . . . 150n of the storage 108 or to the disk drives 150a, 150b . . . 150n of another storage controller. This other storage controller may be part of the computer 102 or connected to the computer 102 by a network 152 via the network adapter 112 as shown for a storage controller 154 and a storage 156 having another set of disk drives 150a, 150b . . . 150n, for example. For such a network connected storage controller 154, the device driver 120 may include network adapter specific commands to communicate with the network adapter 112 to data to the storage controller 154 for writing on the network storage 156.

In certain implementations, the storage controller 109 performs certain functions to assist the computer 102 in reading data from or writing data to the storage 108. For example, the storage controller 109 may have software, firmware or hardware or combinations of these to translate LBA addresses from the computer 102 to cylinder, head and sector specifications of the disk drives 150a, 150b . . . 150n. An example of a suitable storage controller is the ICH5R RAID storage controller marketed by Intel, the assignee of the present application. However, other types of storage controllers are suitable as well.

In migrating data from one storage organization on one or more disk drives to another storage organization on the same or other disk drives, progress indicators or checkpoints are written on the disk drives. As previously mentioned, this checkpointing operation is performed to provide the capability of resuming the migration operation at the address indicated by the most recently written checkpoint after an unexpected failure, for example, a loss of power.

It is appreciated that a checkpoint may be written each time a unit of data is migrated from one data organization to another. For example, if the data is being migrated from a non-RAID disk to a RAID volume, a checkpoint may be written each time a stripe of RAID data is successfully written across the RAID disk drives. However, it is appreciated that such a checking pointing operation will generate many disk write operations which could significantly slow the migration process.

Figure 3A:
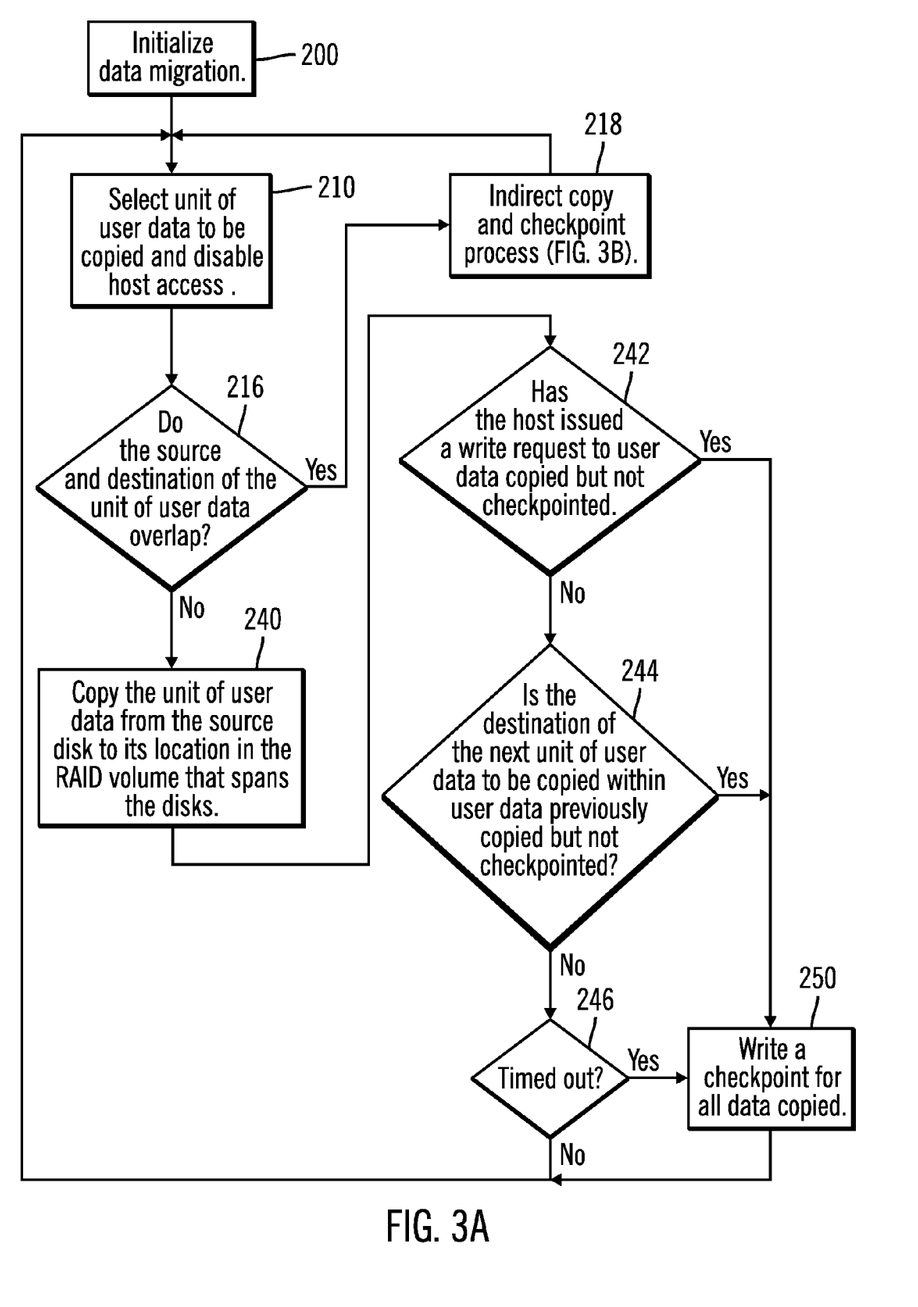
FIGS. 3A, 3B illustrate one embodiment of operations performed to migrate data.
Figure 3B:
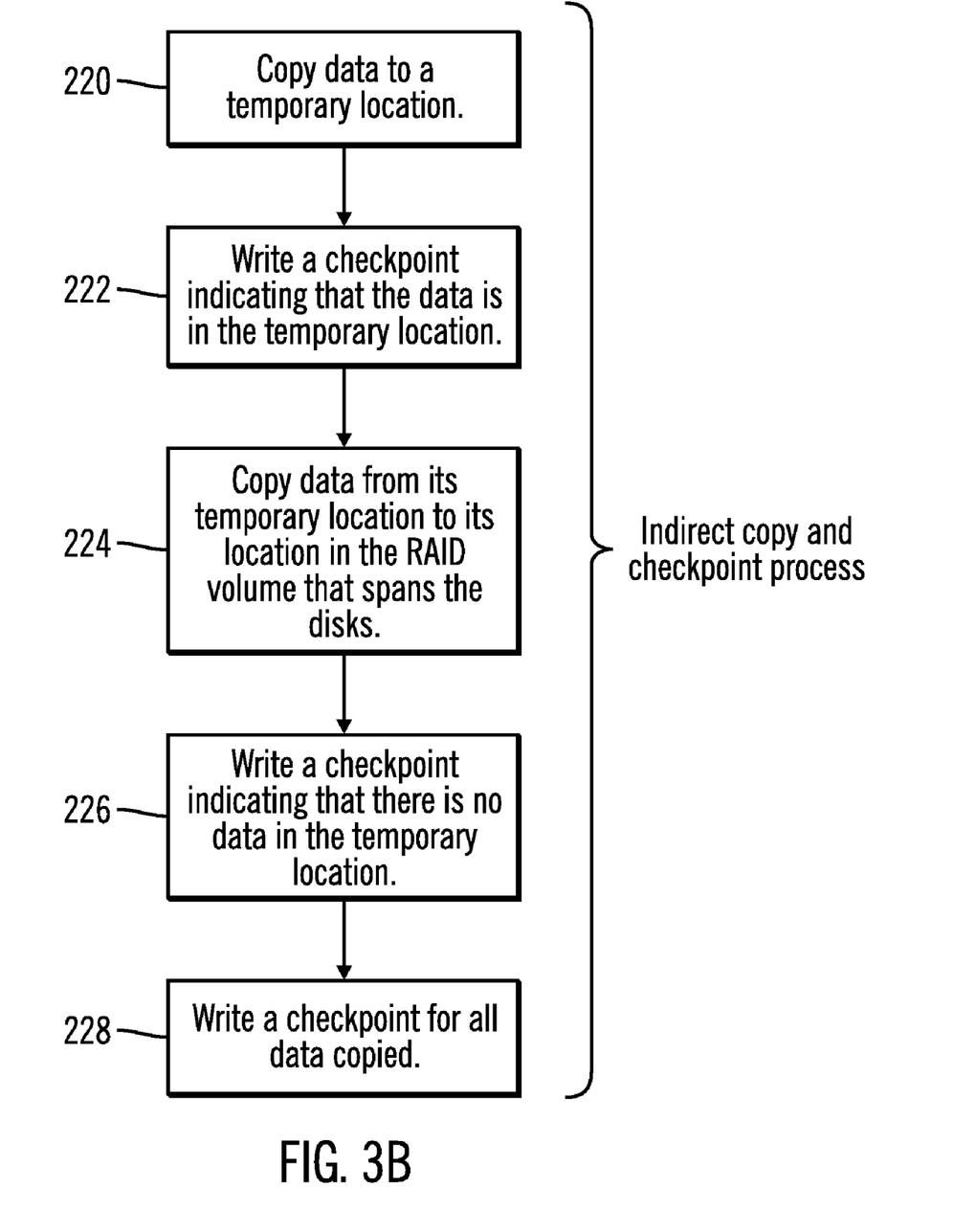

In accordance with one aspect of the illustrated embodiment, a data migration and checkpointing process is provided which can significantly reduce disk write operations resulting from the checkpointing operation and hence can increase the overall speed of the migration process. FIGS. 3A, 3B show one example of operations of a migration manager 130 of a driver 120, in migrating data from a single non-RAID disk drive 150a (FIG. 4) to two RAID level 0 disk drives 150a and 150b. Thus, in this example, the disk drive 150a is both a source disk drive and a destination disk drive. Although this example describes a migration to a RAID level 0 data organization, it is appreciated that, the migration and checkpointing operations described herein can be used in connection with data migrations from one RAID organization type, such as a RAID level 3, for example, to another RAID organization type, such as a RAID level 5, as well as other types of organizations and numbers of disk drives. Also, although the migration manager 130 is discussed in this example as a part of a device driver 120, it is appreciated that the migration manager may be a part of a hardware device such as a storage controller 109 or a network adapter 112 or may be a part of an operating system 110 or an application 114 or any combination of these elements.

In the illustrated embodiment, a portion of data may be referred to as a "volume." A particular disk drive may contain one or more volumes. Similarly, a volume may span one or more disk drives.

To initialize (block 200, FIG. 3A) the data migration process, the migration manager 130 receives a request to make one or more volumes of a non-RAID disk 150a (FIG. 4A) into one or more volumes of a RAID array comprising the disk drives 150a, 150b. In this initialization, the migration manager 130 creates RAID configuration areas 202a, 202b in the disk drives 150a, 150b. If there is insufficient room in either disk drive 150a, 150b for the configuration areas 202a, 202b after the last partition or the partition type of the disk drives 150a, 150b is not supported, the request fails until sufficient room is provided. The migration manager 130 also modifies the appropriate data structures of the device driver 120 or other software to point to the new RAID volume or volumes which are being created so that read and write operations to data successfully migrated to a new RAID volume is directed to that RAID volume.

Also, in this initialization (block 200) of the data migration process, the migration manager 130 stores the appropriate RAID metadata in the configuration areas 202a, 202b. This metadata describes the new RAID organization of the data. Still further, the migration manager 130 divides the migration into multiple operation units. In one embodiment, an operation unit can transfer sufficient user data from the source disk 150a to the destination RAID array 150a, 150b to fill one stripe of data across the disk drives 150a, 150b. In this embodiment, a stripe of data is formed of two blocks of data, one block being written to one of the disk drives 150a, 150b and the other block being written to the other of the disk drives 150a, 150b. One block of data of a stripe can contain one or more bytes of data. For example, a block of data can contain 64 K bytes, such that a stripe of data contains 128 K bytes of data, but other sizes of blocks may be used as well, depending upon the application and the capacity of the disk drives 150a, 150b . . . 150n.

Once the RAID migration has been initialized (block 200), the migration manager 130 selects (block 210) a unit of user data to be migrated from a non-RAID volume such as source volume 212 to a new RAID volume such as destination volume 214. Although the illustrated examples shows a migration from one volume to another, it is appreciated that the migration described herein may be applied to a migration from one or more source volumes to one or more destination volumes.

In this embodiment, the migration manager 130 starts at the lowest address of the non-RAID source volume 212 of disk drive 150a, here LBA 0, and proceeds in sequential fashion to copy the user data to a new RAID destination volume 214 of the RAID array of disk drives 150a, 150b until the highest address of the non-RAID volumes, here represented as LBA n, is copied to a new RAID volume. In addition, access by the host computer 102 to the selected unit of user data is blocked or disabled while the migration of that unit is in progress.

A determination is made (block 210) as to whether the destination location within the destination RAID volume 214, of the selected unit of user data, will overlap the source location within the non-RAID volume 212, of the user data. If yes, an indirect copy and checkpoint process (block 218) is used to migrate the selected unit of user data to the RAID volume 214. In this example, the first block of user data to be migrated will be copied to LBA 0 of the first RAID volume 214. Since disk drive 150a is both a non-RAID source disk and a destination disk of the RAID array, writing RAID data to LBA 0 of the RAID destination volume 214 will overwrite the original user data of the non-RAID source volume 212 starting at LBA 0. Since source and destination locations overlap for the first selected unit of user data (block 216), the indirect copy and check point process (block 218) is used to migrate the first unit of user data.

FIG. 3B shows the indirect copy and checkpoint process of block 218 in greater detail. As described therein, the selected unit of user data, here, the first unit of user data, is copied (block 220) to a temporary location. In the illustrated embodiment, the temporary location is within the configuration areas 202a, 202b of the RAID disk drives 150a, 150b. It is appreciated that in alternative embodiments, the temporary location may be located elsewhere on the disk drives 150a, 150b . . . 150n or the host memory 106.

A checkpoint or other indicator is written (block 222) to the configuration areas 202a, 202b to indicate that the selected unit of data is in the temporary location of the configuration areas 202a, 202b. Accordingly, should the migration process be interrupted after the selected unit of user data is written to the temporary area, upon resumption of the migration process, the selected unit of user data may be found by the migration manager 130 in the temporary area of the configuration areas 202a, 202b.

In a second copy operation, the selected unit of data may be copied (block 224) again, this time from the temporary area to its destination location in the RAID volume 214, which in the illustrated example, will span both disk drives 150a, 150b. A checkpoint or other indicator is written (block 226) to the configuration areas 202a, 202b to indicate that there is no user data in the temporary location of the configuration areas 202a, 202b. Accordingly, should the migration process be interrupted after the selected unit of data has been transferred from the temporary area, upon resumption of the migration process, the migration manager will not look to the temporary area of the configuration areas 202a, 202b to find user data.

Figure 4A:
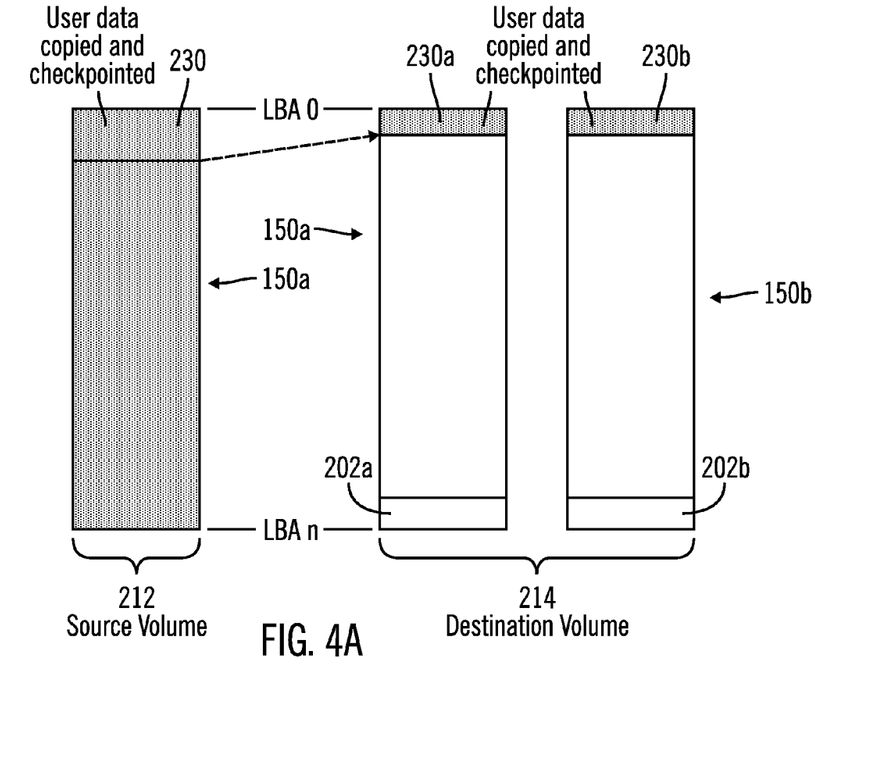
FIGS. 4A–4E illustrate a data migration.

Also, a progress checkpoint of other progress indicator is written (block 228) to the configuration areas 202a, 202b to indicate that the migration process has progressed to include the selected unit of user data. In the illustrated embodiment, the progress checkpoint may include the starting or ending LBA or other address of the selected unit of user data in the source volume 212 to indicate that all user data up and including to the address of the selected unit of data as indicated by the progress checkpoint, has been successfully migrated to the destination volume 214. FIG. 4A illustrates a first unit 230 of user data within the source volume 212, which has been successfully copied and checkpointed, using the indirect copy and checkpointing process (block 218) of FIG. 3B, to the first stripe comprising data blocks 230a and 230b of the RAID volume 214 of the RAID array of disk drives 150a, 150b.

Following the successful migration and checkpointing of the first unit of user data of the source volume 212 which is a non-RAID volume in the illustrated embodiment, the migration manager 130 selects (block 210) the next unit of user data from the source volume 212. As previously mentioned, in this embodiment, the migration manager 130 proceeds in sequential address order to copy the user data to a new RAID volume of the RAID array of disk drives 150a, 150b, until the highest address of the non-RAID volumes, here represented as LBA n, is copied to a new RAID volume. In addition, access by the host computer 102 to the selected unit of user data is blocked or disabled while the migration of that unit is in progress. It is appreciated that the units of user data may be selected for migration using other sequential orders and other techniques.

If the source location of the selected unit of user data does not overlap (block 216) the migration destination of the selected unit of user data, the migration manager 130 can copy (block 240) the selected unit of user data directly from the source non-RAID volume 212 to the destination RAID volume 214. By "directly," it is meant in the context of the block 240 that the selected unit of user data need not be first copied to a temporary location prior to being copied to the destination RAID volume.

In connection with the direct copying of the selected unit of user data, in accordance with another aspect of the migration and checkpointing described herein, the migration manager performs a series of tests on the selected unit of user data, such as, for example, the tests indicated in process blocks 242, 244, 246. If the result of one of the tests of blocks 242, 244, 246 is positive, the migration manager 130 writes (block 250) a progress checkpoint to the configuration areas 202a, 202b. However, if the result of all of the tests of blocks 242, 244, 246 are negative, the migration manager 130, in accordance with an aspect of the described migration process, can defer the writing of a progress checkpoint to the configuration areas 202a, 202b. As a consequence, a substantial portion of data may be migrated from the source non-RAID volume 212 to the destination RAID volume 214 without writing a progress checkpoint for each unit of user data migrated. Thus, the number of progress indicator data write operations is less than the number of copy data write operations.

Figure 4B:
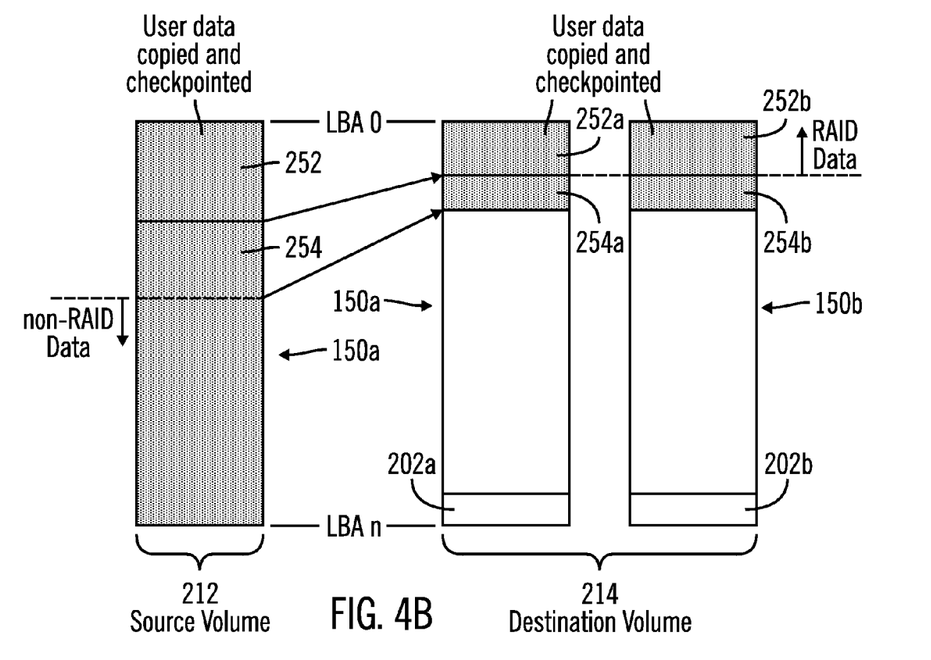

For example, FIG. 4B shows a first portion of user data 252 from the source non-RAID volume 212 which has been successfully migrated to the destination RAID volume 214 as RAID portions 252a and 252b. The user data portion 252 includes a plurality of units of user data. The user data portion 252 has been both copied and checkpointed. Hence, the last progress checkpoint written to the configuration areas 202a, 202b indicates the address of the last unit of user data contained within the successfully migrated portion 252.

FIG. 4B also shows another portion 254 of user data following the portion 252 of user data. The user data portion 254 includes a plurality of units of user data which were successfully copied to the destination RAID volume as RAID portions 254a and 254b but none of the units of portion 254 has been checkpointed at this point in the migration process. Instead, the writing of checkpoints during the copying of the units of user data of the portion 254 has been bypassed to reduce the number of data write operations to the configuration areas 202a, 202b during this portion of the migration process. Hence, as each unit of user data of the portion 254 was selected (block 210) and copied (block 240), each of the tests of the process blocks 242, 244, 246 was determined to have been passed such that a progress checkpoint write operation (block 250) could be bypassed. As a result, the last progress indicator written to the area of the destination volume lacks an indication that a particular unit of data has been successfully copied to the destination volume.

In the unlikely event that a disruption occurs in the migration process at this point, when the migration process subsequently resumes, the migration manager 130 can examine the last progress checkpoint written to the configuration areas 202a, 202b. Since this progress checkpoint indicates that the user data portion 252 was successfully migrated, the migration process can be resumed by copying the user data portion 254. In this manner, the migration process does not need to restart from the beginning of the user data.

In some applications, it may be appropriate to periodically limit the size of the user data portion which can be written to the destination RAID volume without writing any progress checkpoints. Hence, in the illustrated embodiment, a "timer" test (block 246) is provided. If a certain duration of time passes (block 246) since the last time a progress checkpoint was written during the migration process, a progress checkpoint may be automatically written (block 250) to ensure that the size of the user data portion copied but not checkpointed does not exceed a certain size. Thus, in the event of a disruption during the migration process, the amount of user data which may need to be recopied once the migration process resumes, can be reduced. Alternative to marking the passage of time, the timer test (block 246) can also count the number of units of user data copied since the last progress checkpoint was written. If the number of units of user data copied without a progress checkpoint being written exceeds a predetermined number, such as 100 units, for example, again, a progress checkpoint may be automatically written (block 250) to ensure that the size of the user data portion copied but not checkpointed does not exceed a certain size, here 100 units, in this example.

Figure 4C:
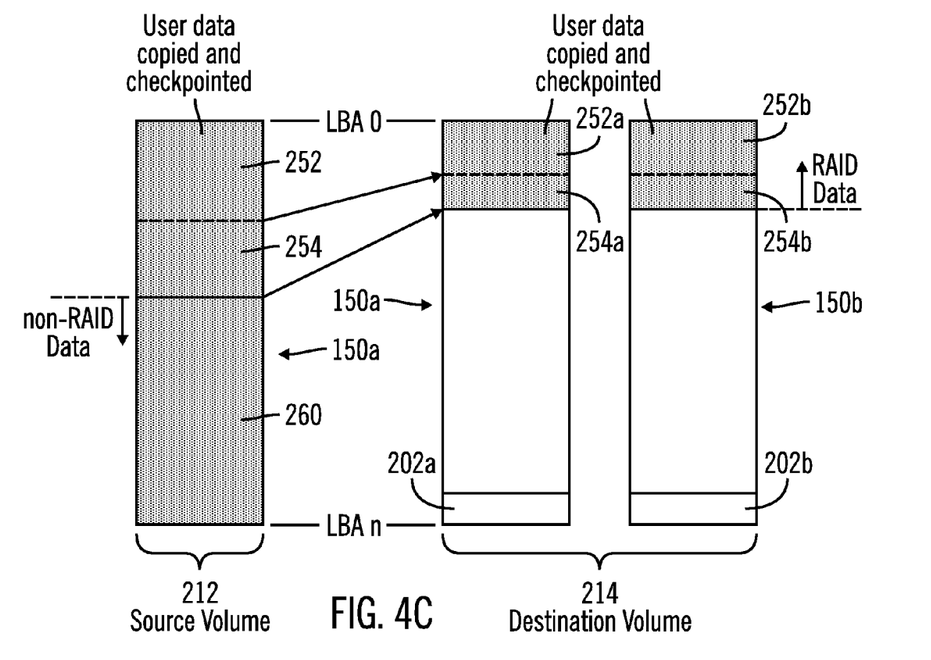

FIG. 4C shows the effect of a progress checkpoint being written to the configuration areas 202a, 202b after the last unit of user data of the portion 254 has been copied to the destination RAID volume 214. If this unit causes the timer (block 246) to time out in the manner discussed above, a progress checkpoint is written (block 250), thereby converting user data portion 254, 254a, 254b to data which has not only been copied but also checkpointed as indicated in FIG. 4C.

Process block 242 provides another example of a test for a unit of user data copied to the destination RAID volume 214 to determine whether a progress checkpoint should be written for the units of user data copied to that point. In the test of block 242, a determination is made as to whether the host computer 102 has issued a write request to a portion of the user data which has been copied but not checkpointed. As previously mentioned, the migration manager 130 blocks or disables (block 210) access to the unit of user data which is being selected for migration. However, for data such as the data portions 252a and 252b (FIG. 4B) which have been both copied and checkpointed, those data portions are safely part of the destination RAID volume 214 and the host computer is permitted to write data to those portions. The device driver 120 will write the new data as RAID data in the portions 252a, 252b of the destination RAID volume 214. On the other hand, data such as data portion 260 (FIG. 4B), which has not yet been migrated to the destination RAID volume 214, is still part of the source non-RAID volume 212. As such, the host computer is permitted to write data in the data portion 260 as non-RAID data in the source non-RAID volume 212.

However, for data such as the data portions 254a, 254b (FIG. 4B) which have been copied but not checkpointed, a data write by the host computer 102 to those portions may cause data loss if a disruption in the migration process occurs before those portions are checkpointed. For example, if the host computer 102 writes updated write data to the destination RAID volume portions 254a, 254b and a disruption in the migration process occurs, the migration manager 130 will recopy the data portion 254 of the source non-RAID volume 212 and the updated data could be lost as a result.

Accordingly, in the illustrated embodiment, a determination is made (block 242) as to whether the host computer 102 has issued a write request to a portion of the user data which has been copied but not checkpointed. If so, a progress checkpoint is written (block 250), thereby converting user data portion 254a, 254b to data which has not only been copied but also checkpointed as indicated in FIG. 4C. The data portions 254a, 254b are now safely part of the destination RAID volume 214 and may be written to by the host computer 102.

Process block 244 provides another example of a test for a unit of user data copied to the destination RAID volume 214 to determine whether a progress checkpoint should be written for the units of user data copied to that point. In the test of block 244, a determination is made as to whether the destination of the next unit of user data to be copied is in a portion of data previously copied but not checkpointed.

Figure 4D:
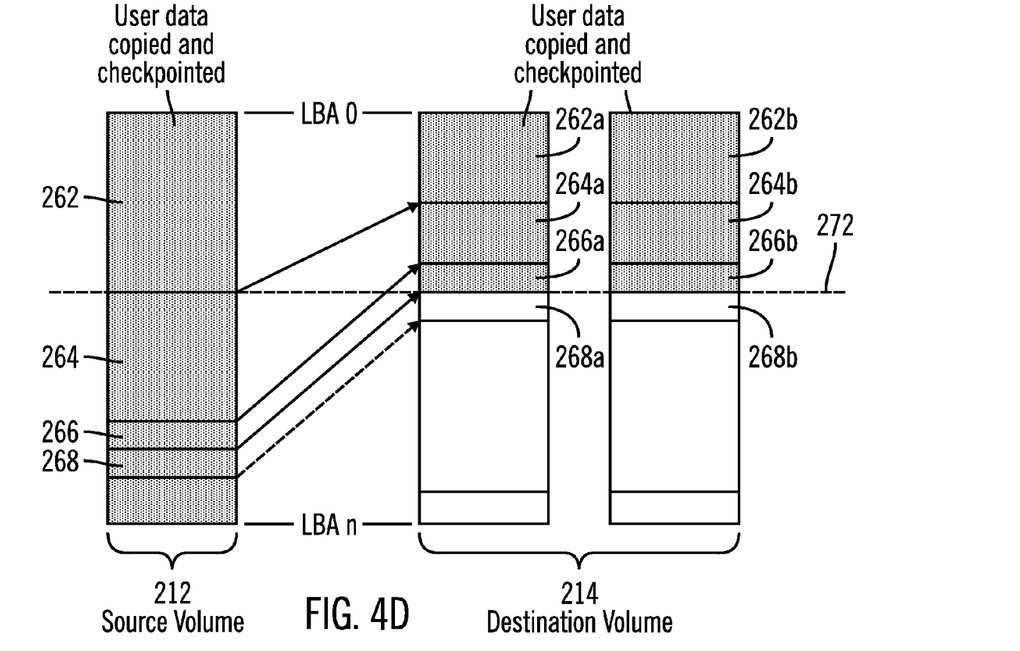

For example, FIG. 4D shows a first portion of user data 262 from the source non-RAID volume 212 which has been successfully migrated to the destination RAID volume 214 as RAID portions 262a and 262b. The user data portion 262 includes a plurality of units of user data. The user data portion 262 has been both copied and checkpointed. Hence, the last progress checkpoint written to the configuration areas 202a, 202b indicates the address of the last unit of user data contained within the successfully migrated portion 262.

FIG. 4D also shows another portion 264 of user data following the portion 262 of user data. The user data portion 264 includes a plurality of units of user data which were successfully copied to the destination RAID volume as RAID portions 264a and 264b but none of the units of portion 264 was checkpointed in order to reduce the number of data write operations to the configuration areas 202a, 202b during the migration process. Hence, as each unit of user data of the portion 264 was selected (block 210) and copied (block 240), each of the tests of the process blocks 242, 244, 246 was passed such that a progress checkpoint write operation (block 260) could be bypassed.

FIG. 4D also shows a unit 266 of user data which has been selected (block 210) for migration to the destination RAID volume to data blocks 266a and 266b of the destination RAID volume. However, the destination block 268a of the next unit 268 of user data to be selected and copied, is below a line 272 separating the data portion 262 (copied and checkpointed) from the data portion 264 (copied but not checkpointed). Hence, the destination 268a of the next unit 268 of user data to be selected and copied is in the data portion 264, that is, a portion of data previously copied but not checkpointed. Thus, if the user data of unit 268 is written to destination 268a of disk driver 150a, a portion of the data portion 264 of disk drive 150a will be overwritten since it is the same disk drive 150a.

If the unit 268 is written to the destinations 268a, 268b such that the destination 268a is written in the data portion 264 which has been copied but not checkpointed, and a disruption occurs in the migration process before the portions 264a, 264b are checkpointed, a loss of data may occur. For example, when the migration process resumes following a disruption, the migration manager 130 will attempt to recopy the source non-RAID volume data portion 264 from disk drive 150a. However, if a portion of the data portion 264 of disk drive 150a has been overwritten, a data loss may occur.

Figure 4E:
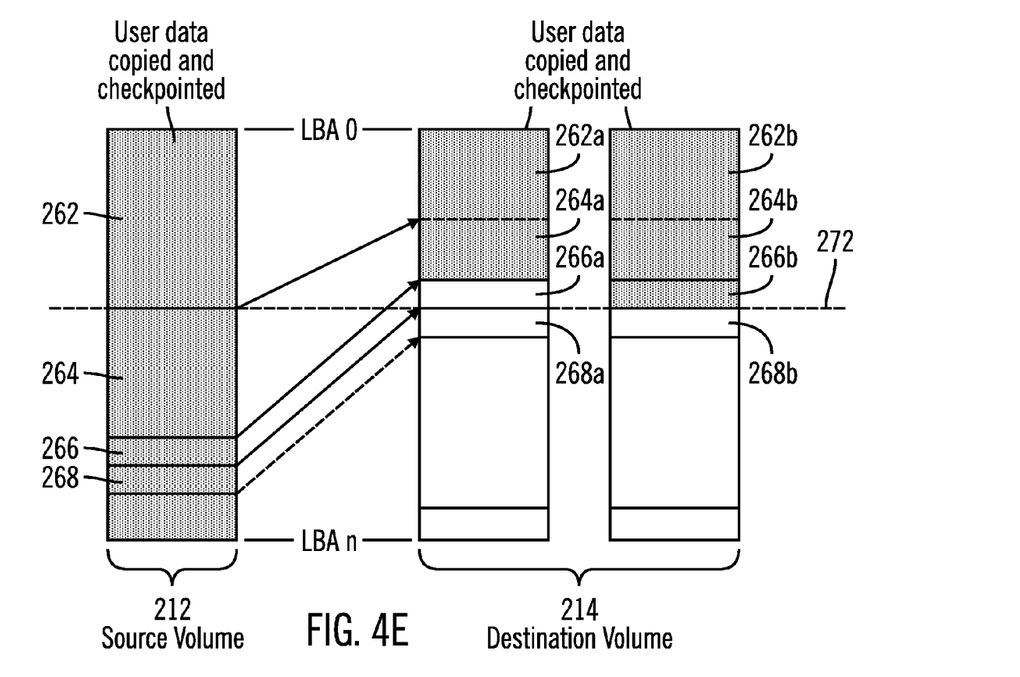

Accordingly, in the illustrated embodiment, a determination is made (block 244) as to whether the destination of the next unit of user data to be copied is in a portion of data previously copied but not checkpointed. If so, a progress checkpoint is written (block 250), thereby converting user data portions 264, 264a, 264b and data unit 266 and data blocks 266a, 266b to data which has not only been copied but also checkpointed as indicated in FIG. 4E. Accordingly, when the next unit 268 is selected (block 210) and copied (block 240), the destination 268a of disk drive 150a will not be in a portion of data copied but not checkpointed. Instead, the destination 268a will be in a portion 264 of disk drive 150a which has been both copied and checkpointed as shown in FIG. 4E. Accordingly, should a disruption occur following the copying (block 240) of the data unit 268, the migration will resume starting with data unit 268 which has not been overwritten.

ADDITIONAL EMBODIMENT DETAILS

The described techniques for managing data migration may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made, and that the article of manufacture may comprise any information bearing medium known in the art.

In certain implementations, the device driver may be included in a computer system including a storage controller, such as a Serial-Advanced Technology Attachment (SATA), a Serial Attached SCSI (SAS), Redundant Array of Independent Disk (RAID), etc., controller, that manages access to a non-volatile storage device, such as a magnetic tape or one or more disk storage units, each disk storage unit including a magnetic disk drive or an optical disk. In alternative implementations, the storage controller embodiments may be included in a system that does not include a driver. Further details on the SATA architecture are described in the technology specification "Serial ATA: High Speed Serialized AT Attachment" Rev. 1.0A (January 2003). Further details on the SAS architecture for devices and expanders are described in the technology specification "Information Technology—Serial Attached SCSI (SAS)", reference no. ISO/IEC 14776-150:200x and ANSI INCITS.***:200x PHY layer (Jul. 9, 2003), published by ANSI.

In certain implementations, the device driver and storage controller embodiments may be implemented in a computer system including a video controller to render information to display on a monitor coupled to the computer system including the device driver and network adapter, such as a computer system comprising a desktop, workstation, server, mainframe, laptop, handheld computer, etc. Alternatively, the storage controller and device driver embodiments may be implemented in a computing device that does not include a video controller.

In certain implementations, the network adapter may be configured to transmit data across a cable connected to a port on the network adapter. Alternatively, the network adapter embodiments may be configured to transmit data over a wireless network or connection, such as wireless LAN, Bluetooth, etc.

The illustrated logic of FIGS. 3A–3B show certain events occurring in a certain order. In alternative embodiments, certain operations including one or more of the tests of blocks 216 and 242–246 may be performed in a different order, modified or removed. Moreover, operations may be added to the above described logic including the tests of blocks 216 and 242–246 and still conform to the described embodiments. Further, operations described herein may occur sequentially or certain operations may be processed in parallel. Yet further, operations may be performed by a single processing unit or by distributed processing units.

Figure 5:
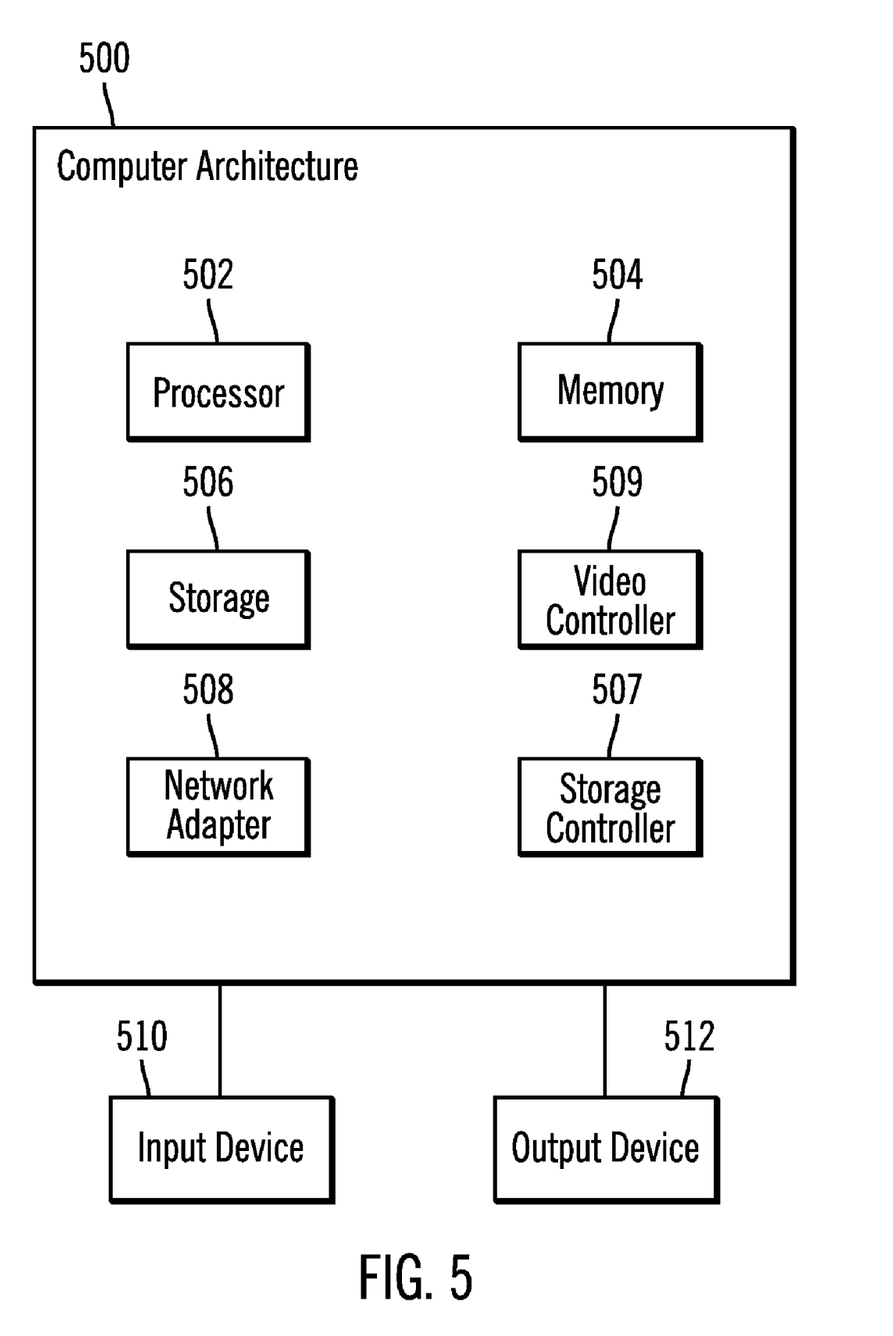
FIG. 5 illustrates an architecture that may be used with the described embodiments.

FIG. 5 illustrates one implementation of a computer architecture 500 of the network components, such as the hosts and storage devices shown in FIG. 4. The architecture 500 may include a processor 502 (e.g., a microprocessor), a memory 504 (e.g., a volatile memory device), and storage 506 (e.g., a non-Volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. A storage controller 507 can control the storage 506. The architecture further includes a network adapter 508 to enable communication with a network, such as an Ethernet, a Fibre Channel Arbitrated Loop, etc. Details on the Fibre Channel architecture are described in the technology specification "Fibre Channel Framing and Signaling Interface", document no. ISO/IEC AWI 14165-25.

Further, the architecture may, in certain embodiments, include a video controller 509 to render information on a display monitor, where the video controller 509 may be implemented on a video card or integrated on integrated circuit components mounted on the motherboard. As discussed, certain of the network devices may have multiple storage cards or controllers. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The storage controller 506 and the network adapter 508 may each be implemented on cards, such as a Peripheral Component Interconnect (PCI) card or some other I/O card, or on integrated circuit components mounted on the motherboard. Details on the PCI architecture are described in "PCI Local Bus, Rev. 2.3", published by the PCI-SIG.

The foregoing description of various embodiments has been presented for the purposes of illustration and description. It is not intended to be exhaustive or to limit to the precise form disclosed. Many modifications and variations are possible in light of the above teaching.

What is claimed is:

1. A method comprising:
   copying a unit of data in a copy data write operation from a source volume of a first organization type to a destination volume of a second organization type;
   writing a progress indicator in a progress indicator data write operation to an area of said destination volume indicating the successful copying of at least said unit of data;
   copying a plurality of additional units of data in a plurality of additional copy data write operations from said source volume to said destination volume; and
   writing an additional progress indicator in an additional progress indicator data write operation to said area of said destination volume indicating the successful copying of at least said plurality of units of data wherein the number of progress indicator data write operations is less than the number of copy data write operations.

2. The method of claim 1 wherein said second organization type is a Redundant Array of Independent Disks organization.

3. The method of claim 2 wherein said unit of data is a stripe of data written across an array of disks of said Redundant Array of Independent Disks organization.

4. The method of claim 3 further comprising:
   copying an additional unit of data in an additional copy data write operation from said source volume to said destination volume;
   testing for the presence of at least one condition of a defined set of conditions; and
   writing an additional progress indicator in connection with said copying an addition unit of data when any one condition of said defined set of conditions is present.

5. The method of claim 4 wherein said testing tests for the presence of each condition of said defined set of conditions, the method further comprising:
   bypassing the writing of an additional progress indicator in connection with said copying an addition unit of data when each condition of said defined set of conditions is absent.

6. The method of claim 4 wherein source volume and said destination volume include a common disk drive.

7. The method of claim 6 wherein said defined set of conditions includes the condition of the destination location within the destination volume for a particular unit of data overlaps with the source location within the source volume for the particular unit of data.

8. The method of claim 6 wherein said defined set of conditions includes the condition of the expiration of a predetermined time period since the last progress indicator data write operation.

9. The method of claim 6 wherein said defined set of conditions includes the condition of the count of copy data write operations since the last progress indicator data write operation exceeding a predetermined count.

10. The method of claim 6 wherein said defined set of conditions includes the condition of a host issuing a write request to a location containing a particular unit of data copied to the destination volume and the last progress indicator written to the area of the destination volume lacks an indication that the particular unit of data has been successfully copied to the destination volume.

11. The method of claim 6 wherein said units of data are copied to the destination volume in address sequential order and the defined set of conditions includes the condition of a unit of data in the sequence to be copied having a destination location within the destination volume, which overlaps with a portion of the destination volume containing units of data copied and the last progress indicator lacks an indication that the units of data of the destination volume portion have been successfully copied to the destination volume.

12. The method of claim 2 wherein said area of said destination volume is a Redundant Array of Independent Disks organization configuration area.

13. An article comprising a storage medium, the storage medium comprising machine readable instructions stored thereon to:
   copy a unit of data in a copy data write operation from a source volume of a first organization type to a destination volume of a second organization type;
   write a progress indicator in a progress indicator data write operation to an area of said destination volume indicating the successful copying of at least said unit of data;
   copy a plurality of additional units of data in a plurality of additional copy data write operations from said source volume to said destination volume; and
   write an additional progress indicator in an additional progress indicator data write operation to said area of said destination volume indicating the successful copying of at least said plurality of units of data wherein the number of progress indicator data write operations is less than the number of copy data write operations.

14. The article of claim 13 wherein said second organization type is a Redundant Array of Independent Disks organization.

15. The article of claim 14 wherein said unit of data is a stripe of data written across an array of disks of said Redundant Array of Independent Disks organization.

16. The article of claim 15 wherein the storage medium further comprises machine readable instructions stored thereon to:
   copy an additional unit of data in an additional copy data write operation from said source volume to said destination volume;
   test for the presence of at least one condition of a defined set of conditions; and
   write an additional progress indicator in connection with said copying an addition unit of data when any one condition of said defined set of conditions is present.

17. The article of claim 16 wherein the machine readable instructions to test include machine readable instructions stored on the storage medium to test for the presence of each condition of said defined set of conditions, and wherein the storage medium further comprises machine readable instructions stored thereon to:
   bypass the writing of an additional progress indicator in connection with said copying an addition unit of data when each condition of said defined set of conditions is absent.

18. The article of claim 16 wherein source volume and said destination volume include a common disk drive.

19. The article of claim 18 wherein said defined set of conditions includes the condition of the destination location within the destination volume for a particular unit of data overlaps with the source location within the source volume for the particular unit of data.

20. The article of claim 18 wherein said defined set of conditions includes the condition of the expiration of a predetermined time period since the last progress indicator data write operation.

21. The article of claim 18 wherein said defined set of conditions includes the condition of the count of copy data write operations since the last progress indicator data write operation exceeding a predetermined count.

22. The article of claim 18 wherein said defined set of conditions includes the condition of a host issuing a write request to a location containing a particular unit of data copied to the destination volume and the last progress indicator written to the area of the destination volume lacks an indication that the particular unit of data has been successfully copied to the destination volume.

23. The article of claim 18 wherein said units of data are copied to the destination volume in address sequential order and the defined set of conditions includes the condition of a unit of data in the sequence to be copied having a destination location within the destination volume, which overlaps with a portion of the destination volume containing units of data copied and the last progress indicator lacks an indication that the units of data of the destination volume portion have been successfully copied to the destination volume.

24. The article of claim 14 wherein said area of said destination volume is a Redundant Array of Independent Disks organization configuration area.

25. A system, comprising:
 at least one memory which includes an operating system and an application;
 a processor coupled to the memory;
 data storage which includes a destination volume and a source volume containing units of data;
 a data storage controller for managing Input/Output (I/O) access to the data storage; and
 a device driver executable by the processor in the memory, wherein at least one of the application, operating system, and device driver is adapted to:
 copy a unit of data in a copy data write operation from a source volume of a first organization type to a destination volume of a second organization type;
 write a progress indicator in a progress indicator data write operation to an area of said destination volume indicating the successful copying of at least said unit of data;
 copy a plurality of additional units of data in a plurality of additional copy data write operations from said source volume to said destination volume; and
 write an additional progress indicator in an additional progress indicator data write operation to said area of said destination volume indicating the successful copying of at least said plurality of units of data wherein the number of progress indicator data write operations is less than the number of copy data write operations.

26. The system of claim 25 wherein said second organization type is a Redundant Array of Independent Disks organization.

27. The system of claim 26 wherein said storage includes an array of storage disks organized in said Redundant Array of Independent Disks organization and a unit of data is a stripe of data written across said array of disks of said Redundant Array of Independent Disks organization.

28. The system of claim 27 at least one of the application, operating system, and device driver is further adapted to:
 copy an additional unit of data in an additional copy data write operation from said source volume to said destination volume;
 test for the presence of at least one condition of a defined set of conditions; and
 write an additional progress indicator in connection with said copying an addition unit of data when any one condition of said defined set of conditions is present.

29. The system of claim 28 wherein said testing tests for the presence of each condition of said defined set of conditions, and at least one of the application, operating system, and device driver is further adapted to:
 bypass the writing of an additional progress indicator in connection with said copying an addition unit of data when each condition of said defined set of conditions is absent.

30. The system of claim 28 wherein source volume and said destination volume include a common disk drive.

31. The system of claim 30 wherein said defined set of conditions includes the condition of the destination location within the destination volume for a particular unit of data overlaps with the source location within the source volume for the particular unit of data.

32. The system of claim 30 wherein said defined set of conditions includes the condition of the expiration of a predetermined time period since the last progress indicator data write operation.

33. The system of claim 30 wherein said defined set of conditions includes the condition of the count of copy data write operations since the last progress indicator data write operation exceeding a predetermined count.

34. The system of claim 30 wherein said defined set of conditions includes the condition of a host issuing a write request to a location containing a particular unit of data copied to the destination volume and the last progress indicator written to the area of the destination volume lacks an indication that the particular unit of data has been successfully copied to the destination volume.

35. The system of claim 30 wherein said units of data are copied to the destination volume in address sequential order and the defined set of conditions includes the condition of a unit of data in the sequence to be copied having a destination location within the destination volume, which overlaps with a portion of the source location within the source volume containing units of data copied and the last progress indicator lacks an indication that the units of data of the source volume portion have been successfully copied to the destination volume.

36. The system of claim 26 wherein said area of said destination volume is a Redundant Array of Independent Disks organization configuration area.

37. The system of claim 25 further comprising a video controller coupled to said processor.

38. A device for use with a data storage which includes a destination volume and a source volume containing units of data, comprising:
 means for copying a unit of data in a copy data write operation from a source volume of a first organization type to a destination volume of a second organization type; and
 means for writing a progress indicator in a progress indicator data write operation to an area of said destination volume indicating the successful copying of at least said unit of data;
 wherein the copying means includes means for copying a plurality of additional units of data in a plurality of additional copy data write operations from said source volume to said destination volume; and
 wherein the writing means includes means for writing an additional progress indicator in an additional progress indicator data write operation to said area of said destination volume indicating the successful copying of at least said plurality of units of data wherein the number of progress indicator data write operations is less than the number of copy data write operations.

39. The device of claim 38 wherein said storage includes an array of storage disks organized in a Redundant Array of Independent Disks organization and a unit of data is a stripe of data written across said array of disks of said Redundant Array of Independent Disks organization.

40. The device of claim 38 wherein:
the copying means includes means for copying an additional unit of data in an additional copy data write operation from said source volume to said destination volume;

the device further includes testing means for testing for the presence of at least one condition of a defined set of conditions; and the writing means includes means for writing an additional progress indicator in connection with said copying an addition unit of data when any one condition of said defined set of conditions is present.

* * * * *